United States Patent
Hiramatsu et al.

(10) Patent No.: US 9,826,119 B2
(45) Date of Patent: Nov. 21, 2017

(54) OPTICAL APPARATUS AND IMAGE READER

(71) Applicant: FUJI XEROX CO., LTD., Tokyo (JP)

(72) Inventors: Takashi Hiramatsu, Kanagawa (JP); Kiyofumi Aikawa, Kanagawa (JP); Masaki Hachisuga, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 15/220,980

(22) Filed: Jul. 27, 2016

(65) Prior Publication Data
US 2017/0280013 A1    Sep. 28, 2017

(30) Foreign Application Priority Data
Mar. 28, 2016    (JP) .................. 2016-064146

(51) Int. Cl.
*H04N 1/04* (2006.01)
*H04N 1/393* (2006.01)
(Continued)

(52) U.S. Cl.
CPC ............ *H04N 1/393* (2013.01); *H04N 1/193* (2013.01); *H04N 1/1936* (2013.01); *H04N 1/1937* (2013.01); *H04N 1/482* (2013.01); *H04N 2201/0081* (2013.01); *H04N 2201/0094* (2013.01)

(58) Field of Classification Search
CPC ............ H04N 13/044; H04N 5/23238; H04N 13/0239; H04N 13/0495; H04N 5/247; H04N 2201/0471; H04N 2201/04729; H04N 2201/04734; H04N 2201/04744; H04N 5/2259; H04N 5/23258; H04N 5/2328; H04N 5/3415
USPC ...... 385/37, 1, 3, 33, 39, 8; 348/144, 36, 40, 348/164, 191, 266, 335, 345, 46, 78; 250/339.07, 206.1, 208.1, 229; 356/4.01, 356/237.1, 28.5, 402, 450, 600; 382/103, 382/203; 264/401; 355/2; 358/474; 359/24, 464, 9

See application file for complete search history.

(56) References Cited

U.S. PATENT DOCUMENTS 7,745,772 B2 *   6/2010   Utagawa .................. G02B 7/34
                                                  250/201.8
7,903,301 B2 *   3/2011   Saiga ................. G02B 17/0848
                                                  358/474

(Continued)

FOREIGN PATENT DOCUMENTS

JP    2010-085862 A    4/2010

*Primary Examiner* — Negussie Worku
(74) *Attorney, Agent, or Firm* — Oliff PLC

(57) ABSTRACT

Provided is an optical apparatus including a line sensor that includes plural detection portions arranged in a lateral direction, the detection portions including plural light-receiving elements arranged in a line shape in a longitudinal direction, a direction corresponding to the and lateral direction being set as a first direction and a direction corresponding to the longitudinal direction being set as a second direction in a surface perpendicular to an optical axis of light which forms an image on the line sensor, and a reduction optical system that reflects light from an original document and guides the reflected light to the detection portion, and includes plural curved-surface mirrors that have curvatures in the first direction and the second direction as a whole.

7 Claims, 9 Drawing Sheets

(51) Int. Cl.
  *H04N 1/193*    (2006.01)
  *H04N 1/48*     (2006.01)

(56) References Cited

U.S. PATENT DOCUMENTS

| | | | | |
|---|---|---|---|---|
| 8,786,925 B2* | 7/2014 | Hart | .................... | G03H 1/2249 |
| | | | | 359/22 |
| 8,976,423 B2* | 3/2015 | Chen | .................... | H04N 1/0473 |
| | | | | 358/409 |
| 9,160,880 B2* | 10/2015 | Osakabe | .............. | H04N 1/1017 |
| 9,406,166 B2* | 8/2016 | Futterer | ................... | G02B 5/32 |
| 9,529,083 B2* | 12/2016 | Bridges | .............. | H04N 1/00827 |
| 2010/0128221 A1* | 5/2010 | Muller | ................ | G02B 21/0028 |
| | | | | 351/207 |
| 2012/0154667 A1* | 6/2012 | Takeuchi | ................. | G02B 7/36 |
| | | | | 348/348 |
| 2012/0327291 A1* | 12/2012 | Takeuchi | ........... | H04N 5/23212 |
| | | | | 348/353 |
| 2013/0242360 A1* | 9/2013 | Aikawa | .............. | H04N 1/00005 |
| | | | | 358/504 |
| 2014/0026155 A1* | 1/2014 | Valin | ...................... | G01D 4/002 |
| | | | | 725/5 |
| 2014/0138901 A1* | 5/2014 | Takahata | ................. | B65H 7/02 |
| | | | | 271/3.19 |

\* cited by examiner

FIG. 6

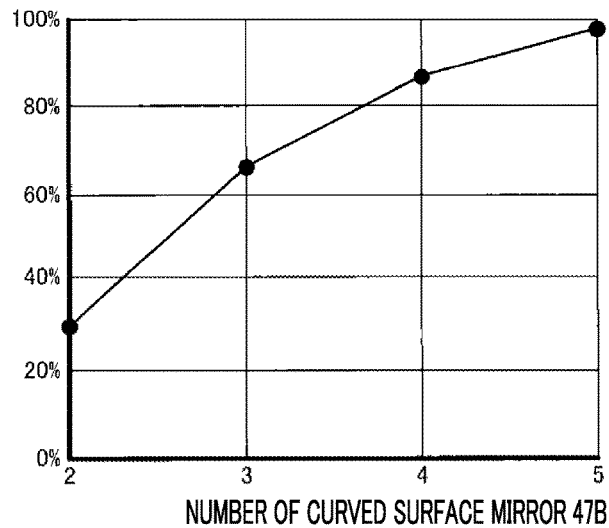

IN CASE WHERE SUB MAGNIFICATION = 2*MAIN MAGNIFICATION, FOCUS DEVIATION RATIO (SUB MAGNIFICATION = MAIN MAGNIFICATION) WHEN SHAPE ACCURACY OF CURVED SURFACE MIRROR 47B(1) IS GIVEN

NUMBER OF CURVED SURFACE MIRROR 47B

・FOCUS SENSITIVITY AGAINST SUB SCANNING SHAPE ACCURACY OF CURVED SURFACE MIRROR IS INEFFECTIVE EVEN IN CASE WHERE SUB MAGNIFICATION BECOMES DOUBLE OF MAIN MAGNIFICATION NUMBER OF CURVED SURFACE MIRRORS IS FIVE

OPTICAL APPARATUS AND IMAGE READER

CROSS-REFERENCE TO RELATED APPLICATIONS

This application is based on and claims priority under 35 USC 119 from Japanese Patent Application No. 2016-064146 filed Mar. 28, 2016.

BACKGROUND

Technical Field

The present invention is related to an optical apparatus and an image reader.

SUMMARY

According to an aspect of the invention, there is provided an optical apparatus including:

a line sensor that includes plural detection portions arranged in a lateral direction, the detection portions including plural light-receiving elements arranged in a line shape in a longitudinal direction, and a direction corresponding to the lateral direction being set as a first direction and a direction corresponding to the longitudinal direction being set as a second direction in a surface perpendicular to an optical axis of light which forms an image on the line sensor; and a reduction optical system that reflects light from an original document and guides the reflected light to the detection portion, and includes plural curved-surface mirrors that have curvatures in the first direction and the second direction as a whole, wherein, in the plural curved-surface mirrors that have the curvatures in the second direction, a curvature in the second direction of a curved-surface mirror, which is arranged at a position nearest to the original document along an optical path, is smaller than the curvatures of remaining curved-surface mirrors in the second direction.

BRIEF DESCRIPTION OF THE DRAWINGS

Exemplary embodiments of the present invention will be described in detail based on the following figures, wherein:

FIG. 6 is a characteristic diagram illustrating the relationship between the number of curved-surface mirrors and focus deviation;

FIGS. 9A and 9B illustrate an image processing apparatus according to a modification example 4, of which FIG. 9A is a general diagram and FIG. 9B is an enlarged diagram of the image reading portion.

DETAILED DESCRIPTION

Figure 1:
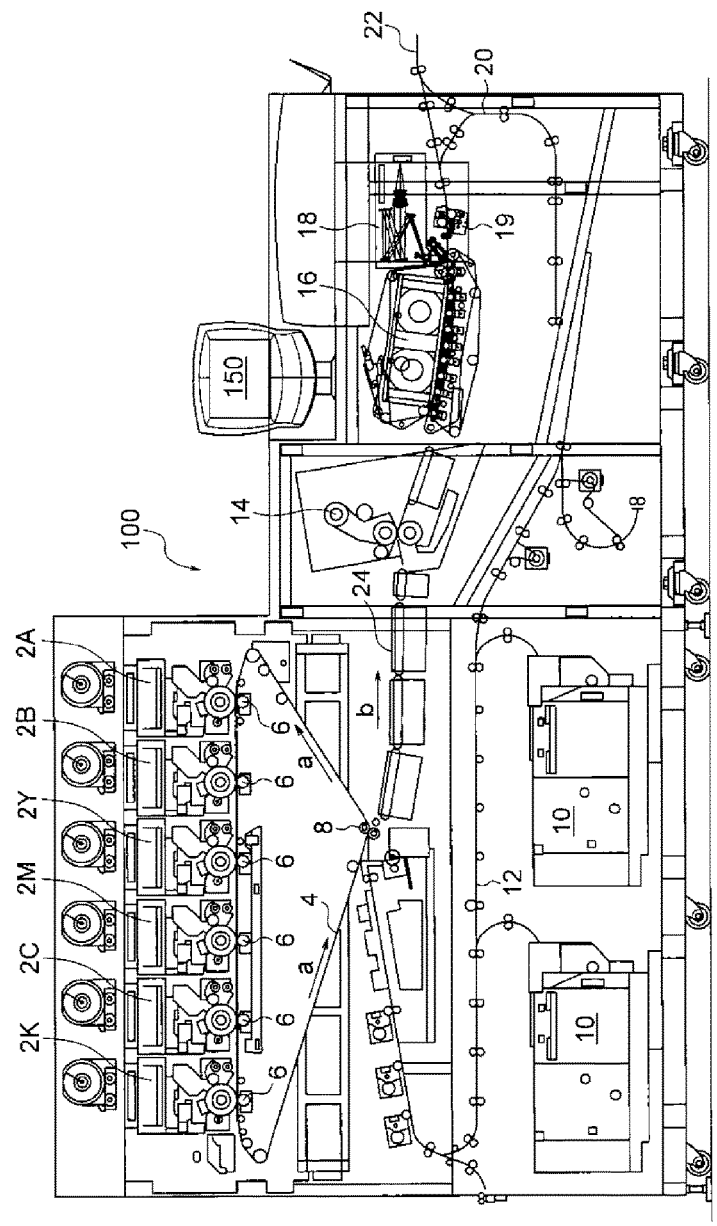
FIG. 1 is a schematic configuration diagram illustrating an image processing apparatus according to an exemplary embodiment.

FIG. 1 illustrates an image processing apparatus 100 according to an exemplary embodiment.

The image processing apparatus 100 includes image print engines 2Y, 2M, 2C, 2K, 2A, and 2B (hereinafter, there is a case of being generically referred to as "image print engines 2") that electrostatically form toner images of respective colors of yellow (Y), magenta (M), cyan (C), black (K), and special colors (here, A and B denote two-types of special colors which are selected) including gold, silver, white, and violet.

In addition, the image processing apparatus 100 includes an intermediate transfer belt 4 that rotates in a direction of an arrow a of FIG. 1 and in which the toner images formed by the image print engines 2 are sequentially transferred, and a primary transfer roller 6 that is provided to interpose the intermediate transfer belt 4 and to face the image print engines 2.

Furthermore, the image processing apparatus 100 includes a pair of secondary transfer rollers 8 that transfer the toner images transferred on the intermediate transfer belt 4 to sheet (recording medium), and a sheet stacker 10 that is provided at the bottom of the image processing apparatus 100 such that the sheet is stored.

The sheet, which is stored in the sheet stacker 10, is supplied to the secondary transfer roller 8 according to a sheet supply path 12.

The image processing apparatus 100 includes a fixing portion 14 that fixes the toner images, which are transferred to the sheet by the secondary transfer roller 8, with heat and pressure, a transport cooling portion 16 that transports the sheet, to which the toner images are fixed in the fixing portion 14, toward the side of a sheet exit while cooling the sheet, an image reader 18 that is provided on the side of the exit of the transport cooling portion 16 and reads the toner images on the sheet, a decurler 19 that is provided on the lower side of the image reader 18, and a sheet return path 20 and the sheet exit 22 which are positioned on the side of the sheet exit against the image reader 18.

The sheet, to which the toner images are transferred by the secondary transfer roller 8, is exported toward the fixing portion 14 and the transport cooling portion 16 along the direction indicated by an arrow b of FIG. 1 according to a sheet export path 24.

Here, in the image processing apparatus 100, the qualities of the color balances, which are the balances of respective colors (Y, M, C, K, and special color) of the toner images, and the existence of the image defect are determined, based on results acquired by reading the toner images in the image reader 18.

Image Reader 18

Figure 2:
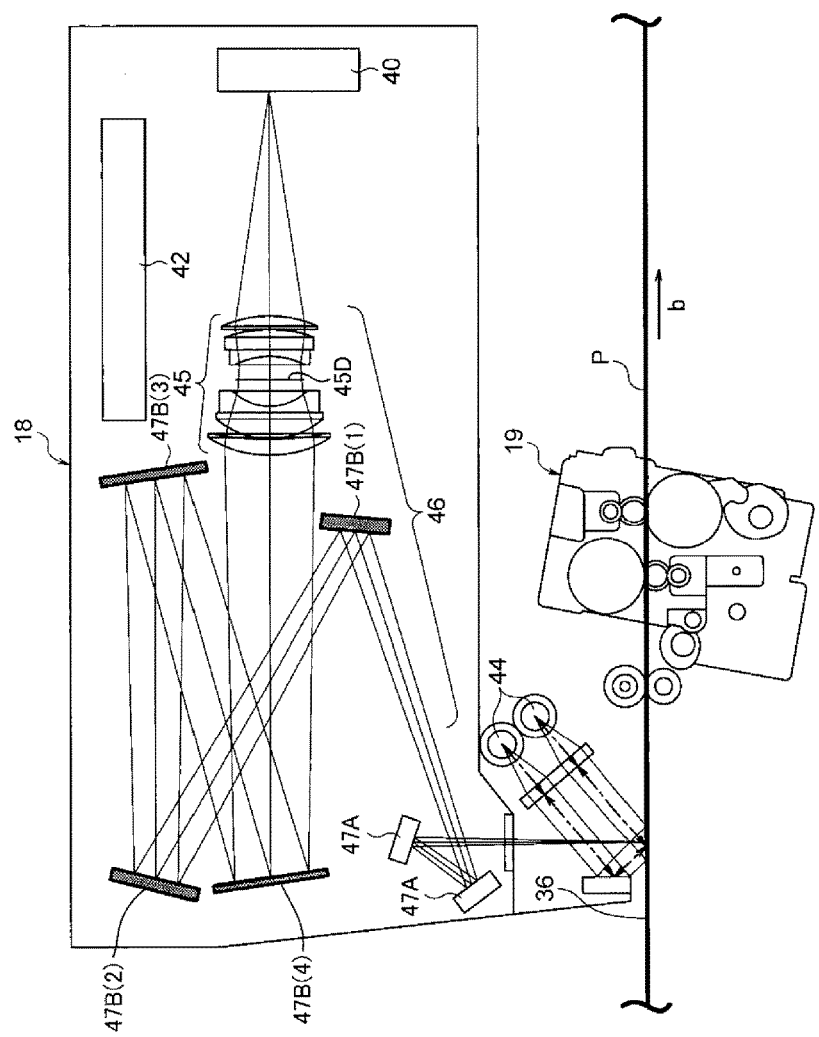
FIG. 2 is an enlarged diagram illustrating an image reading portion that is mounted on the image processing apparatus according to the exemplary embodiment.

As illustrated in FIG. 2, the image reader 18 includes a CCD array 40 as a line sensor, in which a group of solid image capturing devices (CCDs) corresponding to three colors of R (red), G (green), and B (blue) are arranged in a planar shape, that reads an image on the sheet (original document) which passes through an image reading surface 36.

In the CCD array 40, plural line-shaped detection portions, which are formed in such a way that the solid image capturing devices corresponding to plural light-receiving elements are arranged in the main scanning direction, are arranged in the sub scanning direction in column.

In addition, the image reader 18 includes an image relay board 42 that relays image data read in the CCD array 40 to the main control portion (not illustrated in the drawing) of the image processing apparatus 100, xenon lamps 44 that irradiate the sheet transported on the image reading surface 36 with light, a reduction image-forming optical system 46 that guides reflected light, which is acquired in such a way that light from the xenon lamps 44 is hit on the sheet and is reflected, to the CCD array 40, and a housing 48 that stores the CCD array 40, the image relay board 42, and the reduction image-forming optical system 46.

The reduction image-forming optical system 46 is a reduction optical system which forms an image by converging reflected light from the sheet on the CCD array 40. The reduction image-forming optical system 46 includes an imaging lens group 45 that is a transparent image-forming system and a group of reflecting mirrors 47 that is a reflection image-forming system which guides the reflected light from the sheet to the imaging lens group 45.

Meanwhile, a diaphragm mechanism portion 45D is included in the imaging lens group 45. The diaphragm mechanism portion 45D according to the exemplary embodiment may independently adjust a diaphragm value between the longitudinal direction and the lateral direction of the CCD array 40.

Figure 3:
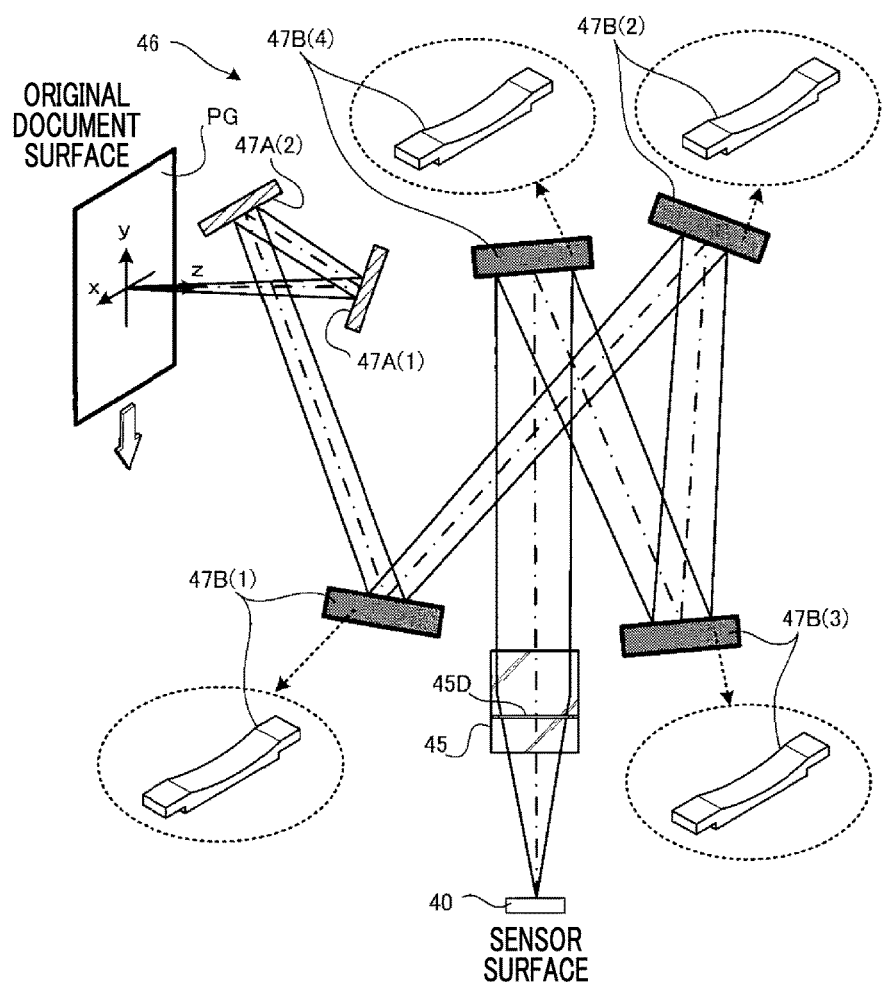
FIG. 3 is a configuration diagram illustrating an image-forming optical system according to the exemplary embodiment.

As illustrated in FIG. 3, the group of reflecting mirrors 47 of the reduction image-forming optical system 46 in the image reader 18 includes two planar mirrors 47A and four curved-surface mirrors 47B.

Light reflected in an original document surface PG is reflected sequentially in the two planar mirrors 47A(1) and 47A(2), is reflected in four curved-surface mirrors in order of a first curved-surface mirrors 47B(1), a second curved-surface mirror 47B(2), a third curved-surface mirror 47B(3), and a fourth curved-surface mirror 47B(4), and reaches the imaging lens group 45.

Curved-Surface Mirror 47B

Figure 4A:
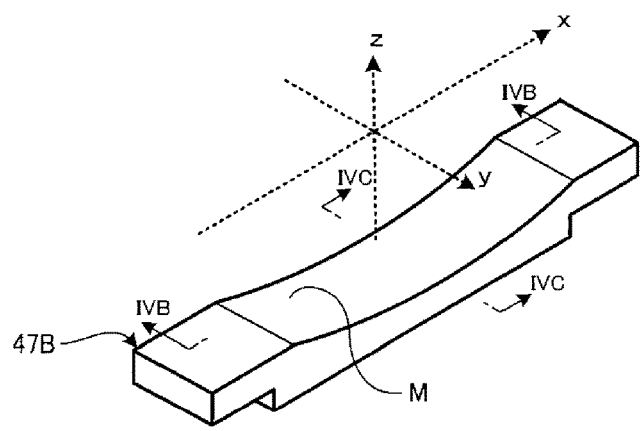
FIGS. 4A to 4C are perspective diagrams illustrating a curved-surface mirror according to the exemplary embodiment.
Figure 4B:
Figure 4C:
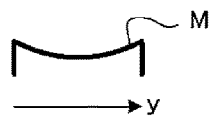

As illustrated in FIGS. 4A to 4C, the four curved-surface mirrors 47B are made of a synthetic resin (plastic), has a reflecting surface M of a rectangular shape in which a direction (x direction) in which main scanning is performed by the CCD array 40 is long, and has a function as a reflecting mirror because a reflection film is deposited on the reflecting surface M.

In an optical axis (z direction of FIG. 3) from the curved-surface mirror 47B to the CCD array 40, the longitudinal direction (x direction of FIG. 3) of the reflecting surface M corresponds to the main scanning direction of the CCD array 40, and the lateral direction (y-direction of FIG. 3) corresponds to the sub scanning direction of the CCD array 40. Hereinafter, there is a case in which the longitudinal direction and the main scanning direction of the CCD array 40 and the lateral direction and the sub scanning direction of the CCD array 40 are differently used appropriately.

Setting of Curvature of Curved-Surface Mirror 47

In the curved-surface mirror 47B, an xy polynomial expression (free curved surface) expressed in expression (1) is used for the shape of the reflecting surface which has a predetermined curvature xy Polynomial Expression $$Z = C_{02}y^2 C_{20}x^2 + C_{03}y^3 + C_{21}x^2y + C_{04}y^4 + C_{22}x^2 + y^2 + C_{40}x^4 + C_{05}y^5 + C_{23}x^2y^3 + C_{41}x^4y + C_{06}y^6 + C_{24}x^2y^4 + C_{42}x^4y^2 + C_{60}x^6 \quad (1)$$

In the shape of the reflecting surface of the curved-surface mirror 47B, the local based on the central normal line (z direction) of the surface is defined by a coordinate system, and the bending degree (hereinafter, referred to as "curvature") of a ray of light due to the reflecting surface is determined by the "tightness" of the curvature (curve) of the surface shape. The curved-surface mirror 47B has curvatures on both sides of the longitudinal direction and the lateral direction of the CCD array 40. In other words, the planar mirror 47A is a planar mirror without curvature.

In a case of the polynomial expression according to expression (1), the curvature is determined by a quadratic coefficient (the longitudinal direction of the CCD array 40:$4 \times C_{20}$, the lateral direction of the CCD array 40:$4 \times C_{02}$). Meanwhile, in a case of a spherical surface mirror, a power p is determined by $2/r$ (r is the radius of curvature). In addition, a focal length f is expressed by the reciprocal number of the curvature (in a case of the spherical surface mirror, $f = 1/p = r/2$)).

Accordingly, the sensitivity of the influence of the shape error of the mirror surface on the focal length decreases as power becomes smaller (curvature becomes larger).

Condition Setting

Here, in the basic design of the reduction image-forming optical system 46, the magnification in the longitudinal direction of the CCD array 40 is the same as the magnification in the lateral direction of the CCD array 40 (magnification in the longitudinal direction=magnification in the lateral direction) and an image is formed on the light reception surfaces of the CCD array 40.

Condition 1

However, the light reception surfaces of the respective colors are arranged in a state of being deviated at predetermined intervals in the lateral direction of the CCD array 40 in terms of the structure. Therefore, with regard to the same image, light is received with time difference, and the time difference according to the predetermined intervals is corrected. Here, in a case in which the magnification in the longitudinal direction of the CCD array 40 is the same as the magnification in the lateral direction, degree of the influence due to vibration is large in the lateral direction of the CCD array 40.

In addition, in the curved-surface mirror 47B, there is a case in which the curvature errors are generated in the lateral direction of the CCD array 40 by the respective curved-surface mirrors 47B due to the shape accuracy of the reflecting surface.

In the exemplary embodiment, the magnification in the lateral direction of the CCD array 40 in the curved-surface mirror 47B(1) that is nearest to the original document surface PG is larger than the magnification in the longitudinal direction of the CCD array 40 (and included in a range of the focal depth of the light reception surfaces of the CCD array 40), the influence of vibration is decreased, thereby improving S/N ratios of the respective colors.

Condition 2

In addition, in the exemplary embodiment, inventors have found that the shape accuracy of the curved-surface mirror 47B, which is positioned on a side nearest to the original document surface PG along the optical axis for the final image detection has the large influence on final image detection in the detection surface of the CCD array 40.

That is, in the exemplary embodiment, a plastic mirror (a reflection film is deposited on a reflecting surface M of a molded article made of a synthetic resin) is applied to the curved-surface mirror 47B. The reason for this is that it takes time for production in a case in which glass or a resin is cut and polished and accuracy is poor.

In contrast, in a case of the curved-surface mirror 47B of the plastic mirror, there is a tendency that the shape accuracy of the reflecting surface M is poor in the lateral directions of the CCD array 40 which are at the ends of the longitudinal direction of the CCD array 40. In particular, the length of the optical path as far as the CCD array 40 is long in the curved-surface mirror 47B at a position which is nearest to the original document surface PG (refer to FIG. 3), and thus the shape accuracy has the large influence on image-forming performance.

That is, the curved-surface mirror 47B(1) illustrated in FIG. 3 corresponds to the curved-surface mirror 47B at a position which is nearest to the original document surface PG. In the exemplary embodiment, the configuration of condition 1 is set as the curvature in the lateral direction of the CCD array 40, and the curvature in the lateral direction of the CCD array 40 in the curved-surface mirror 47B(1) becomes small (=approaches the same size) compared to those of the other curved-surface mirrors 47B(2), 47B(3), and 47B(4), and thus the curvature (curve) in the lateral direction of the CCD array 40 is relaxed.

Meanwhile, it is possible to change the curved-surface mirror 47B, which is positioned on the side nearest to the original document surface PG along the optical axis, with the curved-surface mirror 47B(1) which is positioned on a side farthest from the CCD array 40.

Hereinafter, operations of the exemplary embodiment will be described.

Image Forming Procedure

If image data is input to the image print engines 2, the toner images are formed on the surface of a photoconductor drum in the respective image print engines 2.

The toner images formed by the image print engines 2 are sequentially transferred to the intermediate transfer belt 4 by the primary transfer roller 6, and thus full-color toner images are formed.

At the same time, the sheet is supplied to the secondary transfer roller 8 from the sheet stacker 10 through the sheet supply path 12, and the full-color toner images on the intermediate transfer belt 4 are transferred to the sheet by the secondary transfer roller 8.

The sheet to which the full-color toner images are transferred is introduced to the fixing portion 14 through the sheet export path 24, and thus the full-color toner images on the sheet are fixed by the fixing portion 14.

Subsequently, the sheet to which the full-color toner images are fixed by the fixing portion 14 is introduced to the transport cooling portion 16, and is transported along a transport direction b.

The sheet passes through the transport cooling portion 16 and then passes through the image reading surface 36. Here, the surface of the sheet on a side in which the full-color toner images are formed is irradiated with light from the xenon lamp 44 of the image reader 18.

Furthermore, the reflected light from the sheet is introduced to the imaging lens group 45 by the reflecting mirror 47, and forms an image on the CCD array 40 by the imaging lens group 45.

In the CCD array 40, the intensities of the respective R, G, and B colors are measured for the image which is formed, thereby acquiring the image data for the respective R, G, and B colors. The image data which is acquired in the CCD array 40 is input to a control computer through the image relay board 42.

In the control computer, the qualities of the color balances of the respective Y, M, C, and K colors of the full toner images, which are formed on the sheet, and the existence of the image defect are determined based on the input image data. Furthermore, in a case in which it is determined that the color balances of the full-color toner images are lower than a fixed reference, the color balances of the full-color toner images are improved to be equal to or higher than the reference by respectively controlling the image print engines 2.

Even in a case in which image defect is detected, the image print engines 2 are respectively controlled such that the image defect is addressed in the same manner or reduced to a permissible range.

The sheet, which is acquired after the image is read by the image reader 18, passes through the decurler 19 such that the curl thereof is removed, and is accumulated in the sheet exit 22.

However, in a case in which the double-sided printing of the toner images is performed on the sheet, the sheet which passes through the decurler 19 is introduced to the sheet return path 20.

In the sheet return path 20, the front and the back sides of the sheet are reversed such that a surface on a side in which the full-color toner images are not formed faces the side of the image print engines 2, and are returned to the sheet supply path 12. The sheet which is returned to the sheet supply path 12 is supplied to the secondary transfer roller 8 such that the back surface faces upper side, and toner images which are different from those on the front surface are transferred to the back surface by the secondary transfer roller 8.

Setting of Condition 1

In a case in which the magnification in the main scanning direction is the same as the magnification in the sub scanning direction in the light reception surfaces of the respective colors of the CCD array 40, the degree of the influence due to vibration is large in sub scanning direction.

In the CCD array 40, reading is performed using plural light-receiving element lines which are arranged to be deviated in the sub scanning direction. If vibration is generated in the image-forming optical system during, for example, the reading operation in a case of using the configuration in which the light-receiving element lines for the respective colors are arranged to be deviated in the sub scanning direction, there is a case in which color deviation is generated in the sub scanning direction in the read data of the respective colors which are acquired by performing a synchronized process.

In addition, in a case in which the magnification in the lateral direction of the CCD array 40 is the same as the magnification in the longitudinal direction of the CCD array 40 (the magnification in the lateral direction of the CCD array 40=the magnification in the longitudinal direction of the CCD array 40), the quantity of received light by the CCD array 40 is not sufficient, and thus the S/N ratio is reduced.

Here, in the exemplary embodiment, the magnification in the lateral direction of the CCD array 40 is larger than the magnification in the longitudinal direction of the CCD array 40. Therefore, compared to a case in which the magnification in the lateral direction of the CCD array 40 is equal to the magnification in the longitudinal direction of the CCD array 40, the color deviation is reduced and the S/N ratio of the quantify of received light is improved.

Setting of Condition 2

In a case of the condition 1, the magnification in the lateral direction of the CCD array 40 is larger than the magnification in the longitudinal direction of the CCD array 40 of the curved-surface mirror 47B as a whole. In this case, as described in the exemplary embodiment, the allocation (magnification allocation) of the curves ("tightness" of curvatures) of the four curved-surface mirrors 47B against the reflecting surface M in the lateral direction of the CCD array 40 is not particularly limited.

Based on condition 1, in the magnification allocation of the magnification in the lateral direction of the CCD array 40 between the four curved-surface mirrors 47B, the inventors have found that the shape accuracy of the curved-surface mirror 47B, which is positioned on a side nearest to the original document surface PG along the optical axis for the final image detection has the large influence on final image detection in the detection surface of the CCD array 40.

Here, in condition 2, with regard to the allocation of the magnification in the lateral direction of the CCD array 40, the curvature ("tightness" of curve) in the lateral direction of the CCD array 40 is relaxed by causing the magnification in the lateral direction of the CCD array 40 to be large (causing the reduction magnification to be small) in the curved-surface mirror 47B(1) compared to the other curved-surface mirrors 47B(2), 47B(3), and 47B(4).

In the exemplary embodiment, in a case in which the curve of the curved-surface mirror 47B(1) is moderated and the magnification in the lateral direction of the CCD array 40 becomes large, it is preferable that the magnification in the longitudinal direction of the CCD array 40 is maintained.

Magnification Setting

Figure 5A:
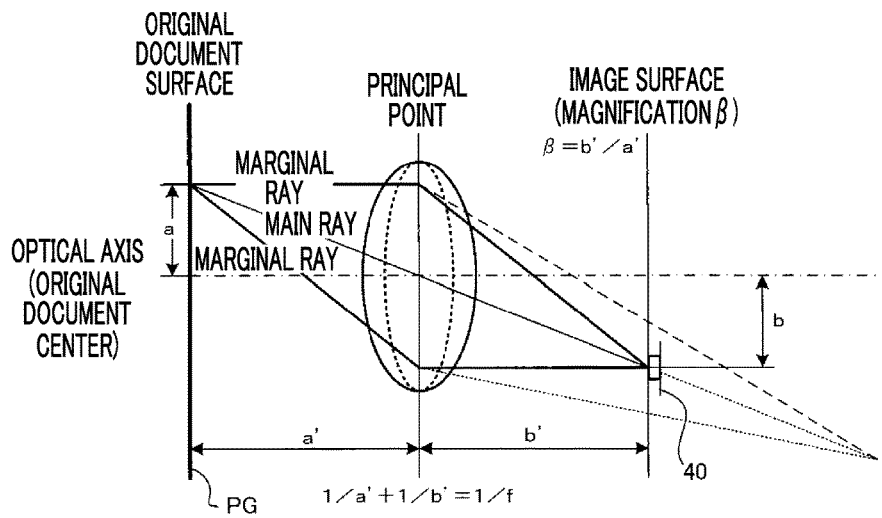
FIG. 5A is a front view illustrating a basic configuration of the optical system and FIG. 5B is a front view illustrating the state of an optical axis in a case in which magnification is changed.

As illustrated in FIG. 5A, a magnification β (β=b/a) is determined by the detection width b of the CCD array 40/an original document width a, in both of the longitudinal direction and the lateral direction of the CCD array 40.

In addition, the magnification β (β=b'/a') may be acquired using a distance a' from the original document surface PG to the center of the lens (principal point) and a distance b' from the principal point to the detection surface of the CCD array 40.

In a case of a reduction optical system, such as the image-forming optical system according to the exemplary embodiment, 0<β<1. That is, in the exemplary embodiment, it is possible to replace condition 2, that is, "the curvature in the lateral direction of the CCD array 40 in the curved-surface mirror 47B(1) is smaller than the magnifications of other curved-surface mirrors 47B(2), 47B(3), and 47B(4)" with "the magnification of the curved-surface mirror 47B(1) in the lateral direction of the CCD array 40 is larger (approaches "1") than the magnifications of other curved-surface mirrors 47B(2), 47B(3), and 47B(4)".

As illustrated in FIG. 5A, in order to increase the distance b' while fixing the distance a' using the lens formula (1/a'+1/b'=1/f), it is necessary to increase the focal length f.

That is, if the magnification β is given in the maximum ("1") direction, it is possible to relax the curvature (curve) of the curved-surface mirror 47B as a result.

Figure 5B:
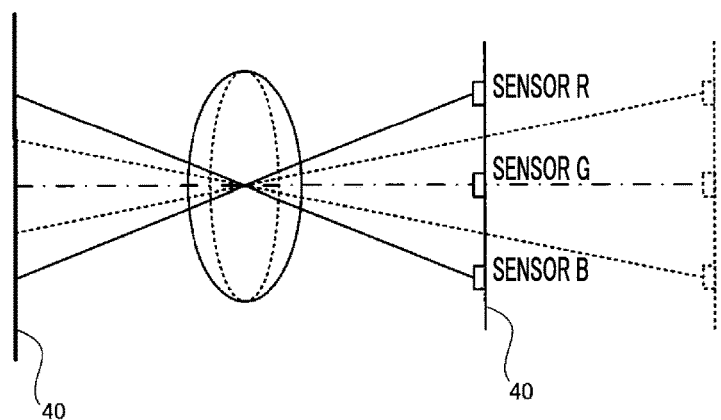

In this case, as illustrated in FIG. 5B, in a case in which the magnification in the lateral direction (sub scanning direction) of the CCD array 40 is adjusted to integral-multiple of the magnification in the longitudinal direction (main scanning direction) of the CCD array 40, it is not necessary to change the reading timings of the main scanning and the sub scanning by the R color sensor, the G color sensor, and the B color sensor of the CCD array 40 before and after changing the magnification.

Reason of Specification of Number of Curved-Surface Mirrors 47B

FIG. 6 is a characteristics diagram illustrating a ratio of the amount of focus deviation in a case in which the shape accuracy of the curved-surface mirror 47B(1) nearest to the original document is given for each number of the curved-surface mirrors 47B, which are applied in the image-forming optical system, based on the magnification in the lateral direction of the CCD array 40=2×the magnification in the longitudinal direction of the CCD array 40.

As understood from FIG. 6, it is understood that, if five or more curved-surface mirrors 47B are provided, it is not effective even though the magnification in the lateral direction of the CCD array 40 is doubled. Accordingly, an advantage of the exemplary embodiment is remarkably shown in a case in which two to four curved-surface mirrors 47B are provided.

Moderation of Curve by Diaphragm Mechanism Portion 45D

In the exemplary embodiment, with regard to the allocation of the magnification in the lateral direction of the CCD array 40, the curvature in the lateral direction of the CCD array 40 is relaxed in the curved-surface mirror 47B(1), compared to the curved-surface mirrors 47B(2), 47B(3), and 47B(4). However, in a case in which the sensitivity of the shape accuracy is moderated by considering only the curved-surface mirror 47B(1), it is effective to perform diaphragm by a diaphragm mechanism portion 45D in order to compensate the focus deviation.

Figure 7:
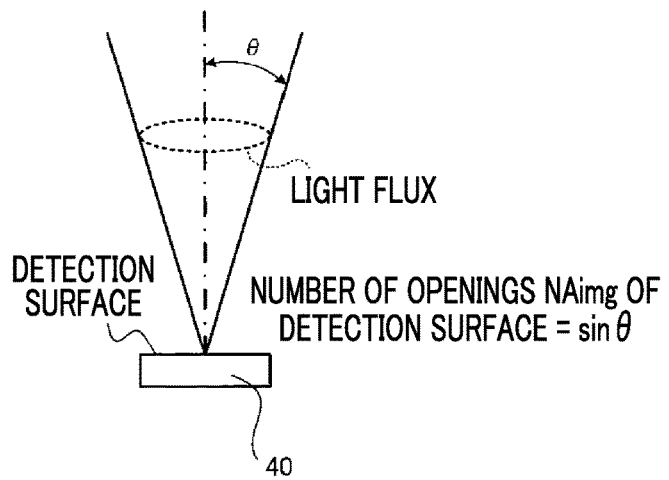
FIG. 7 is a side diagram illustrating the vicinity of a sensor detection surface in order to indicate the relationship between light flux and the numerical aperture.

As illustrated in FIG. 7, light flux is defined by the quantity of light for each unit solid angle which reaches one point of the detection surface of the CCD array 40.

The numerical aperture NAimg of the CCD array 40 is determined by the half-value angle θ of the light flux (NAimg=sin θ).

In addition, the numerical aperture NAimg of the CCD array 40 depends on the focal length f and an aperture (approximated to the size of the diaphragm D) (NAimg=D/2f).

The brightness B (B=NAimg$^2$) of the image-forming optical system is determined by the numerical aperture of the CCD array 40, in both of the longitudinal direction (x direction) of the CCD array 40 and the lateral direction (y direction) of the CCD array 40.

Here, if the NAimg of the image-forming optical system becomes small (dark), it is possible to relax the curvature (curve) of the curved-surface mirror 47B while maintaining the focusing position. The NAimg of the image-forming optical system may be small (dark) in such a way as to cause the diaphragm D to be narrow or the focal length f to extend. Meanwhile, it is preferable that the magnification in the lateral direction of the CCD array 40 approaches the same magnification.

Here, in the exemplary embodiment, in a case in which compensation for the weakening of the curvature of the curved-surface mirror 47B(1) is performed by the diaphragm mechanism portion 45D, the curvature differs between the longitudinal direction and the lateral direction of the CCD array 40, and thus the optimal position of the diaphragm differs between the longitudinal direction and the lateral direction of the CCD array 40. Here, it is preferable to adjust the diaphragm mechanism portion 45D independently in the diaphragm position in the longitudinal direction of the CCD array 40 and the diaphragm position in the lateral direction of the CCD array 40.

The numerical aperture in the longitudinal direction of the CCD array 40 may be the same as the numerical aperture in the lateral direction of the CCD array 40. However, in a case in which the numerical aperture in the longitudinal direction of the CCD array 40 is larger than the numerical aperture in the lateral direction of the CCD array 40, it is possible to relax the curvature in the lateral direction of the CCD array 40, with the result that the surface shape of the reflecting surface M of the curved-surface mirror 47B is simplified, and thus it is possible to lower the sensitivity of the shape accuracy.

Modification Example 1

Figure 8:
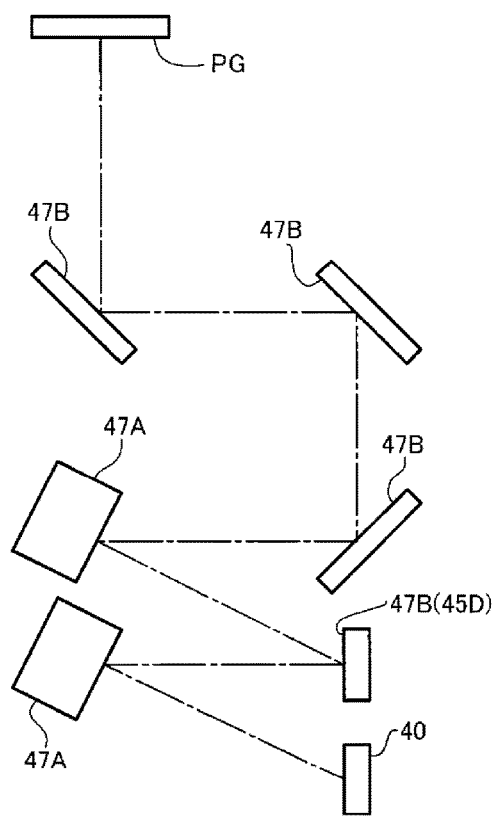
FIG. 8 is a schematic diagram illustrating an example of arrangement of the optical system in which aberration is equally balanced according to a modification example 1.

The reduction image-forming optical system 46 applied to the exemplary embodiment is limited to be stored in the housing 48 of the image reader 18. However, in a case in which a storage region is not limited, it is preferable to provide a reduction image-forming optical system in which planar mirrors, which are not necessary to be adjusted, and curved-surface mirrors, which are necessary to be adjusted, are bent in the lateral direction (y direction) of the CCD array 40 against the Z axis of the original document surface PG to be capable of being separately assembled and the mirrors are guided to the CCD array 40, as illustrated in FIG. 8.

Modification Example 2

In the exemplary embodiment, in a case in which it is necessary to compensate for the amount of moderation of the curvature of the curved-surface mirror 47B(1), which is the specific curved-surface mirror, in the lateral direction of the CCD array 40, the amount of moderation may be offset by adjusting (tightly adjusting the curvature) the magnifications of the curved-surface mirrors 47B(2), 47B(3) and 47B(4) other than the specific curved-surface mirror.

Modification Example 3

The curved-surface mirror 74B, which is applied to the exemplary embodiment, is an optical system which has respective curvatures in the longitudinal direction and the lateral direction of the CCD array 40. However, a reflection optical system may be added which has the curvature in the lateral direction of the CCD array 40 and does not have the curvature in the longitudinal direction of the CCD array 40.

As the number of reflection optical systems increases, the shape accuracy is relaxed while position accuracy becomes tight. Here, in a case in which the reflection optical system that has the curvature in the lateral direction of the CCD array 40 and does not have curvature in the longitudinal direction of the CCD array 40 is provided, it is possible to relax the sensitivity of the shape accuracy in the lateral direction of the CCD array 40 without causing the sensitivity of the position accuracy in the longitudinal direction of the CCD array 40 to be tight.

Modification Example 4

The image processing apparatus 100, to which the reduction image-forming optical system according to the exemplary embodiment is applied, performs correction by reading the original document image which is formed in the image print engines 2. However, the image processing apparatus 100 may be applied to an image reading portion 238 of a so-called multifunction printer (MFP) 200, illustrated in FIGS. 9A and 9B, as the reduction image-forming optical system.

Figure 9A:
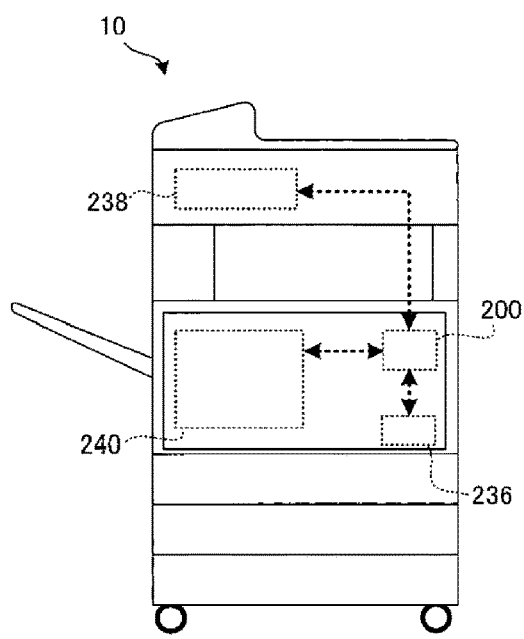

As illustrated in FIG. 9A, an image processing apparatus 10 includes an image forming portion 240 that forms an image on the sheet, the image reading portion 238 that reads an original document image, and a facsimile communication control circuit 236. In addition, the image processing apparatus 10 includes a main control portion 200 that generally controls the entire apparatus so as to primarily store the image data of the original document image which is read by the image reading portion 238 or deliver the read image data to the image forming portion 240 or the facsimile communication control circuit 236 by controlling the image forming portion 240, the image reading portion 238, and the facsimile communication control circuit 236.

Figure 9B:
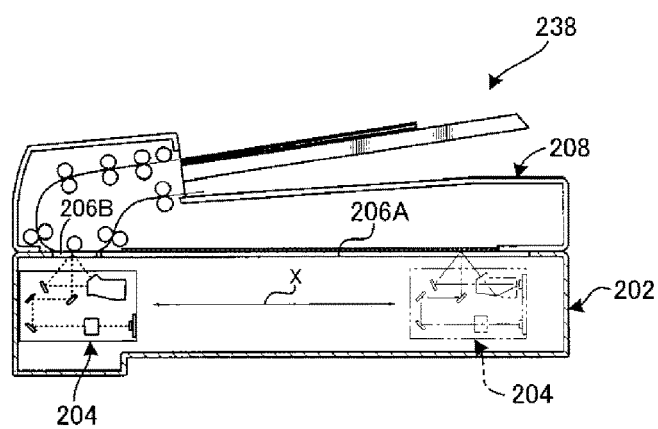

As illustrated in FIG. 9B, an image reading portion 202 of the image reading portion 238 includes a reading unit 204 having the reduction image-forming optical system that causes the original document to be irradiated with light and reads light by the CCD array while reflecting light, which is irradiated to the original document and is reflected on the original document surface, using the reflecting mirrors.

The reading unit 204 is enabled to move in the direction of an arrow X of FIG. 9B, and is able to read the image of the original document which is placed on a first platen glass 206A in such a way as to move in the direction of the arrow X of FIG. 9B.

In contrast, in a case in which the image of the original document which is transferred by the original document transport apparatus 208 is read, the original document is stopped at a reading position of one end portion of the image reading portion 238. Furthermore, in a case in which the original document passes through the reading position of the second platen glass 206B, the image of the original document is read.

In the image reading portion 238, the reflecting mirror which is applied to the reading unit 204 includes two to four curved-surface mirrors, and the curved-surface mirror which is nearest to the original document on the optical path is the specific curved-surface mirror which is the target of the exemplary embodiment.

Modification Example 5

In the exemplary embodiment, it is preferable that the curved-surface mirror 47B is close to the CCD array 40 along the optical path in terms of the shape accuracy. However, there is a tendency that the curved-surface mirror 47B is far from the CCD array 40 because of the limitation or the like of an assembly area. As a result, in a case in which the curved-surface mirror 47B which has the large influence on the final image detection is specified, the curved-surface mirror 47B is set to the curved-surface mirror 47B(1) on a side which is nearest to the original document surface PG.

There is not a problem in a case in which two to four curved-surface mirrors 47B are provided. However, if a case in which the optical path length is further extended and the number of reflections increases compared to the current condition (for example, the exemplary embodiment) is considered, there is a possibility that the plural curved-surface mirrors 47B has the influence on the image detection in terms of the shape accuracy.

Here, it is preferable to set the plural curved-surface mirrors 47B, which are arranged at positions of which the optical path length is equal to or longer than a predetermined length on the optical path from the CCD array 40, as the targets of the specific curved-surface mirror, together with at least specific curved-surface mirror 47B(1) which is positioned to be nearest to the original document surface PG, and to set the curvature which is smaller than the curvatures of the curved-surface mirrors 47B other than the specific curved-surface mirror 47B(1).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An optical apparatus comprising:
   a line sensor that includes a plurality of detection portions arranged in a lateral direction, the detection portions including a plurality of light-receiving elements arranged in a line shape in a longitudinal direction, and a direction corresponding to the lateral direction being set as a first direction and a direction corresponding to the longitudinal direction being set as a second direction in a surface perpendicular to an optical axis of light which forms an image on the line sensor; and
   a reduction optical system that reflects light from an original document and guides the reflected light to the detection portion, and includes a plurality of curved-surface mirrors that have curvatures in the first direction and the second direction as a whole,
   wherein the curved-surface mirror nearest to the original document along an optical path has a curvature in the second direction that is smaller than the curvatures of other curved-surface mirrors of the plurality of curved-surface mirrors in the second direction.

2. The optical apparatus according to claim 1,
   wherein the reduction optical system has a magnification in the second direction which is larger than a magnification in the first direction as a whole.

3. The optical apparatus according to claim 2,
   wherein the reduction optical system has the magnification in the second direction which is integral-multiple of the magnification in the first direction as a whole.

4. The optical apparatus according to claim 1,
   wherein the plurality of curved-surface mirrors include a curved-surface mirror that has a curvature in the second direction and does not have a curvature in the first direction.

5. The optical apparatus according to claim 1, further comprising:
   a diaphragm that is arranged on the optical path of the reduction optical system, and in which a diaphragm position in the first direction and a diaphragm position in the second direction is independently adjustable.

6. The optical apparatus according to claim 1,
   wherein, in the reduction optical system, the numerical aperture in the first direction is equal to or larger than the numerical aperture in the second direction.

7. An image reader comprising:
   a light source that irradiates an original document with light;
   a line sensor that includes a plurality of detection portions arranged in a lateral direction and reads an image of the original document, the detection portions including a plurality of light-receiving elements arranged in a line shape in a longitudinal direction, and a direction corresponding to the lateral direction being set as a first direction and a direction corresponding to the longitudinal direction being set as a second direction in a surface perpendicular to an optical axis of light which forms an image on the line sensor; and
   a reduction optical system that reflects light from the original document and guides the reflected light to the detection portion, and includes a plurality of curved-surface mirrors that have curvatures in the first direction and the second direction as a whole,
   wherein the curved-surface mirror nearest to the original document along an optical path has a curvature in the second direction that is smaller than the curvatures of other curved-surface mirrors of the plurality of curved-surface mirrors in the second direction.

* * * * *